US008279472B2

(12) United States Patent  
Sato

(10) Patent No.: US 8,279,472 B2  
(45) Date of Patent: Oct. 2, 2012

(54) IMAGE PROCESSING APPARATUS AND CONTROL METHOD THEREFOR

(75) Inventor: Yukimasa Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 12/340,381

(22) Filed: Dec. 19, 2008

(65) Prior Publication Data

US 2009/0161159 A1    Jun. 25, 2009

(30) Foreign Application Priority Data

Dec. 21, 2007 (JP) ................................. 2007-330955

(51) Int. Cl.  
  *G06F 3/12* (2006.01)
(52) U.S. Cl. ..................... 358/1.15; 358/1.13; 358/1.16; 358/1.18; 707/602; 707/662; 707/663; 709/213
(58) Field of Classification Search .................. None  
See application file for complete search history.

(56) References Cited

U.S. PATENT DOCUMENTS

| | | | |
|---|---|---|---|
| 6,633,404 B1* | 10/2003 | Atsumi .................... 358/1.16 |
| 2004/0201749 A1* | 10/2004 | Malloy Desormeaux ......... 348/231.99 |
| 2004/0247308 A1* | 12/2004 | Kawade ...................... 396/310 |
| 2005/0027954 A1* | 2/2005 | Rothman et al. .............. 711/159 |
| 2006/0007481 A1 | 1/2006 | Kato |
| 2007/0067397 A1* | 3/2007 | Tran ............................ 709/206 |
| 2008/0192129 A1* | 8/2008 | Walker et al. .............. 348/231.2 |

FOREIGN PATENT DOCUMENTS

| | | |
|---|---|---|
| JP | 2001-282587 A | 10/2001 |
| JP | 2006-23942 | 1/2006 |

\* cited by examiner

*Primary Examiner* — Marivelisse Santiago Cordero  
*Assistant Examiner* — Miya J Cato  
(74) *Attorney, Agent, or Firm* — Canon U.S.A., Inc. IP Division

(57) ABSTRACT

An image processing apparatus capable of executing a plurality of types of jobs includes a storage unit configured to store an integrated document including image data and a plurality of types of accompanying information related to the image data, a receiving unit configured to receive an instruction for executing a job for the integrated document stored in the storage unit, a deletion unit configured to delete at least a part of the accompanying information of the integrated document for which the instruction for executing the job is received by the receiving unit if the job for which the instruction for execution is received by the receiving unit is a predetermined type of job, and an execution unit configured to execute the job for which the instruction for execution is received by the receiving unit.

11 Claims, 15 Drawing Sheets

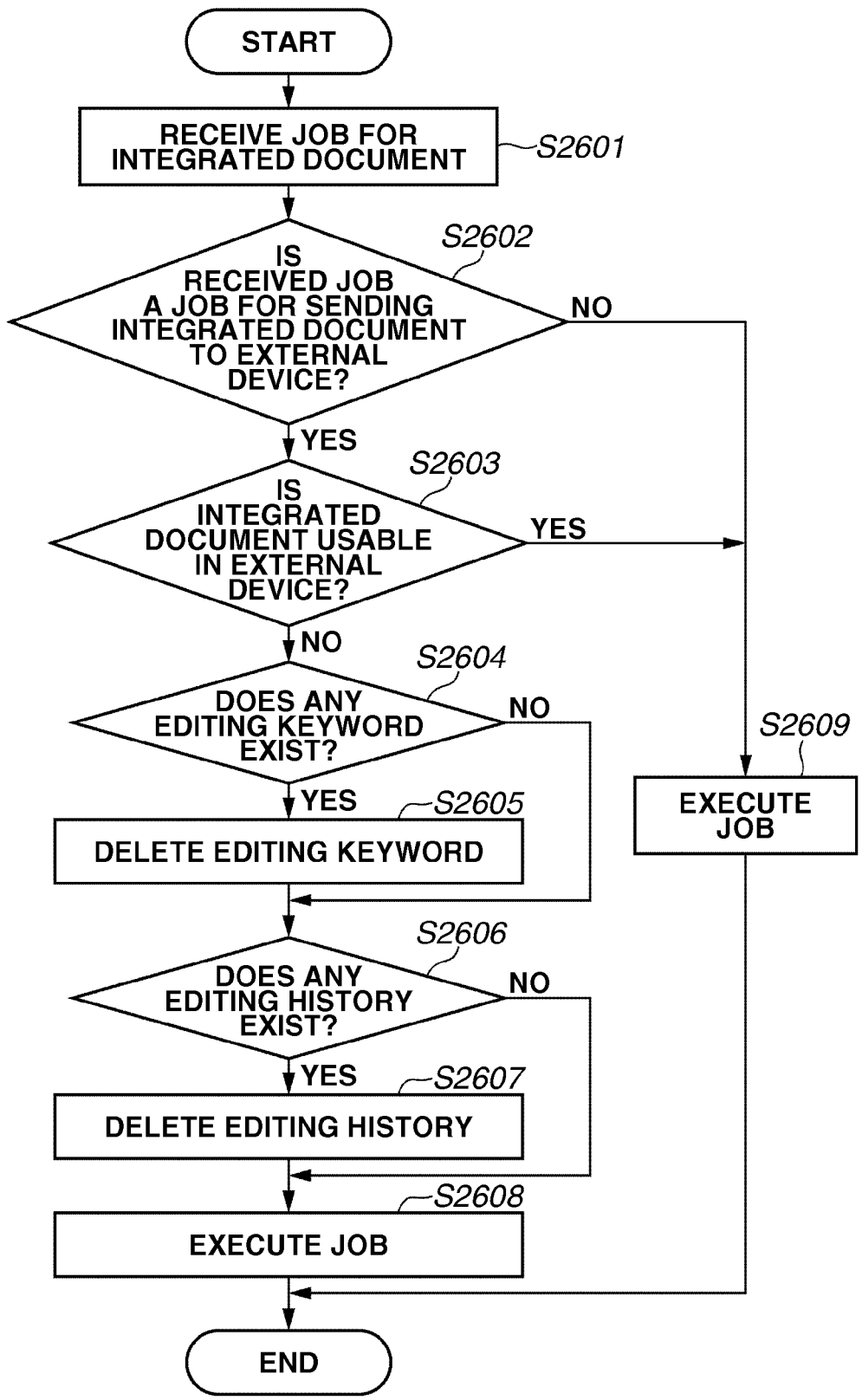

IMAGE PROCESSING APPARATUS AND CONTROL METHOD THEREFOR

BACKGROUND OF THE INVENTION

1. Field of the Invention

The present invention relates to an image processing apparatus and an integrated document generation method.

2. Description of the Related Art

Conventionally, image data is stored in a storage device in an image processing apparatus, such as a multifunction peripheral (MFP), in bitmap format. When the volume of image data stored in the storage device increases, it becomes difficult to find a target file from a list of information including file names and thumbnails.

It will be convenient if a user inputs a keyword included in the target file using a user interface (UI) and causes the MFP to display a list of files that match the keyword according to a search function. However, the image data stored in the storage device of the MFP does not include such a keyword that can be used for searching for a file.

On the other hand, a technique used for vectorizing a bitmapped image input by an image input apparatus is discussed in Japanese Patent Application Laid-Open No. 2006-23942. Data obtained by vectorizing a bitmapped image is referred to as vector data.

The vector data is used for drawing. Thus, the vector data, which is generated by the vectorization, does not necessarily contain a keyword for the search, which is, for example, character string information or image information in a document. For this reason, secondary information obtained from bitmapped image data is generated as additional information, which is not printed, and added to the vector data. Such secondary information is referred to as metadata. The generated metadata is generally added to a job, a page, or a collection of drawing objects (for example, in drawing units of text/graphic/image). Image data can be searched using such metadata.

However, if all secondary information is registered as metadata, the data volume of the metadata becomes extremely large, thus increasing the data size of a document that contains metadata and vector data. Accordingly, searching for a document or transmitting a document between a plurality of MFPs that are connected to one another over a network becomes time-consuming. Further, metadata is not always necessary depended on an application of the image data. Using image data that includes metadata for an application that does not require metadata means wasting a storage area that is used in storing the image data. In addition, transmission time of the image data would unnecessarily increase.

SUMMARY OF THE INVENTION

The present invention is directed to an image processing apparatus that is capable of appropriately reducing the volume of metadata in an integrated document.

According to an aspect of the present invention, an image processing apparatus capable of executing a plurality of types of jobs includes a storage unit configured to store an integrated document including image data and a plurality of types of accompanying information related to the image data, a receiving unit configured to receive an instruction for executing a job for the integrated document stored in the storage unit, a deletion unit configured to delete at least a part of the accompanying information of the integrated document for which the instruction for executing the job is received by the receiving unit, if the job for which the instruction for execution is received by the receiving unit is a predetermined type of job, and an execution unit configured to execute the job for which the instruction for execution is received by the receiving unit.

According to another aspect of the present invention, an image processing apparatus includes a storage unit configured to store an integrated document including image data and a plurality of types of accompanying information related to the image data, a detection unit configured to detect a size of a free space used for storing the integrated document in the storage unit, and a deletion unit configured to delete a predetermined type of accompanying information from among the accompanying information of the integrated document stored in the storage unit, if the detection unit detects that the size of the free space is smaller than a predetermined size.

According to yet another aspect of the present invention, an image processing apparatus includes a storage unit configured to store an integrated document including image data and a plurality of types of accompanying information related to the image data, a detection unit configured to detect an integrated document that has remained unaccessed for a predetermined period of time from among integrated documents stored in the storage unit, and a deletion unit configured to delete a predetermined type of accompanying information from among the accompanying information of the integrated document detected by the detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 is a flowchart illustrating an example of deletion processing of the integrated document performed by the MFP when a job is executed according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
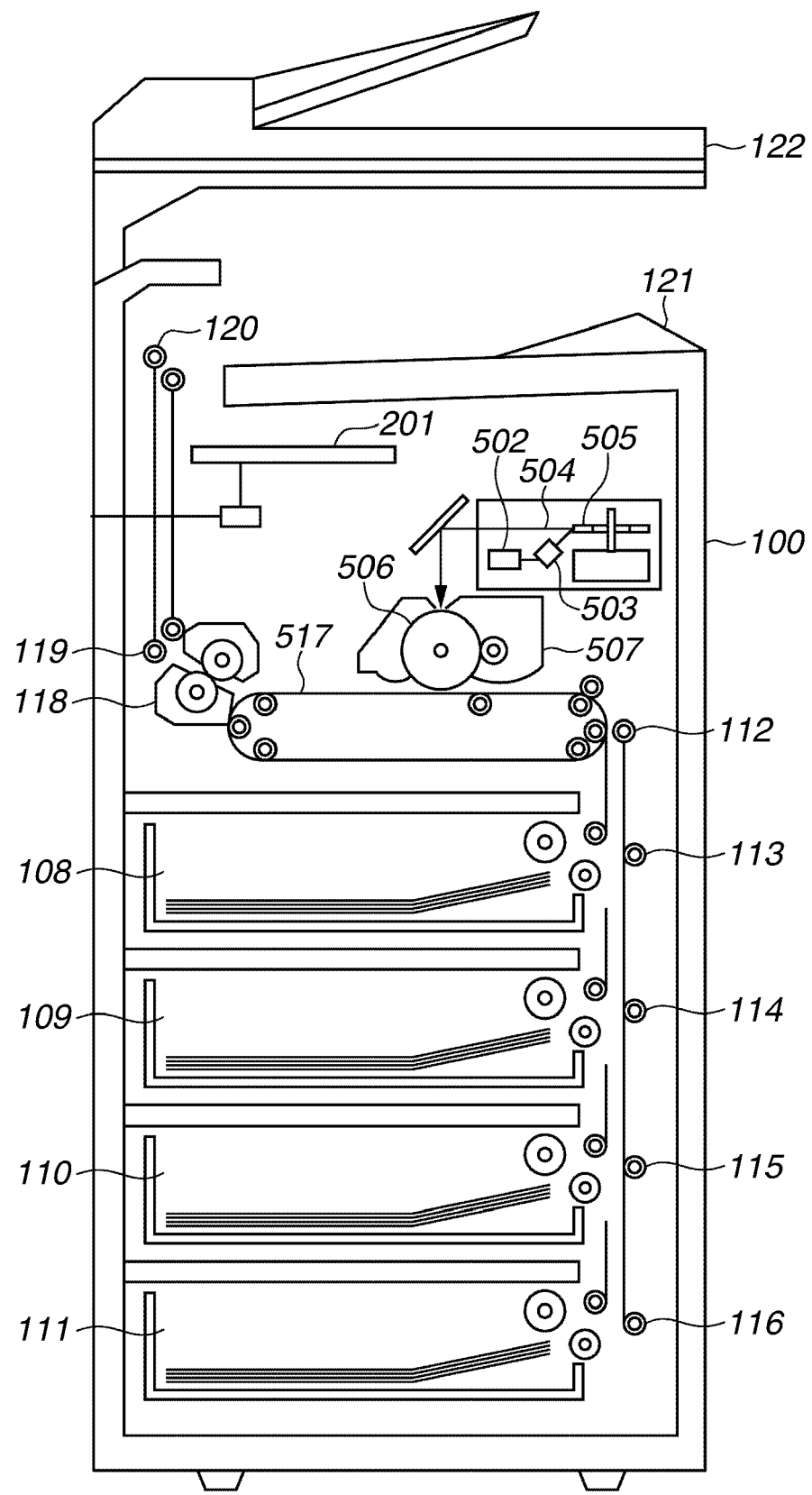
FIG. 1 is a cross section of a configuration of an MFP as an example of an image processing apparatus according to an exemplary embodiment of the present invention.

FIG. 1 is a cross-sectional illustration of an internal configuration of an MFP serving as an image processing apparatus according to an exemplary embodiment of the present invention. The MFP includes a print function, a copy function, and a facsimile function.

In FIG. 1, an MFP 100 can be used as a network printer configured to receive print data via a network and to print the received data. Further, since the MFP 100 is connected to a telephone line, the MFP 100 can also be used as a facsimile machine. Additionally, the MFP 100 can be used as a copying machine.

An operation panel 121 includes a switch used for operation and a liquid crystal touch panel used for displaying a status of the MFP 100. A control unit 201 is used for controlling the MFP 100.

A laser driver 502 is a circuit used for driving a semiconductor laser oscillator 503. According to an input video signal, the laser driver 502 turns on/off a laser beam 504, which is emitted from the semiconductor laser oscillator 503. The laser beam 504 is directed onto a polygonal mirror 505, at which the laser beam 504 is reflected to scan an electrostatic drum 506. As a result, an electrostatic latent image is formed on the surface of the electrostatic drum 506. After the electrostatic latent image is developed by a developing unit (toner cartridge) 507 arranged in a periphery of the electrostatic drum 506, the developed image is transferred onto a sheet of recording paper. Cut sheets can be used as the recording paper. The cut sheets are set in sheet cassettes 108, 109, 110, and 111, which are installed in the MFP 100. The cut sheets are conveyed by feeding rollers 113, 114, 115, and 116, and placed on a print paper conveying belt 517 by a print paper conveyance roller 112. Then, the cut sheets are conveyed through an image-forming/developing mechanism.

Toner (powdered ink) that is transferred to the recording paper is fixed onto the paper according to applied heat and pressure by a fixing device 118. The toner-fixed recording paper is discharged outside from the MFP 100 by conveyance rollers 119 and 120.

A scanner unit 122 scans a document to capture a reflected image. After A/D conversion, the captured image is sent to the control unit 201, converted into a video signal after necessary processing, and input to the laser driver 502. Similarly, when print data is received via an external network, the print data is analyzed by the control unit 201, converted into a video signal, and input to the laser driver 502.

Figure 2:
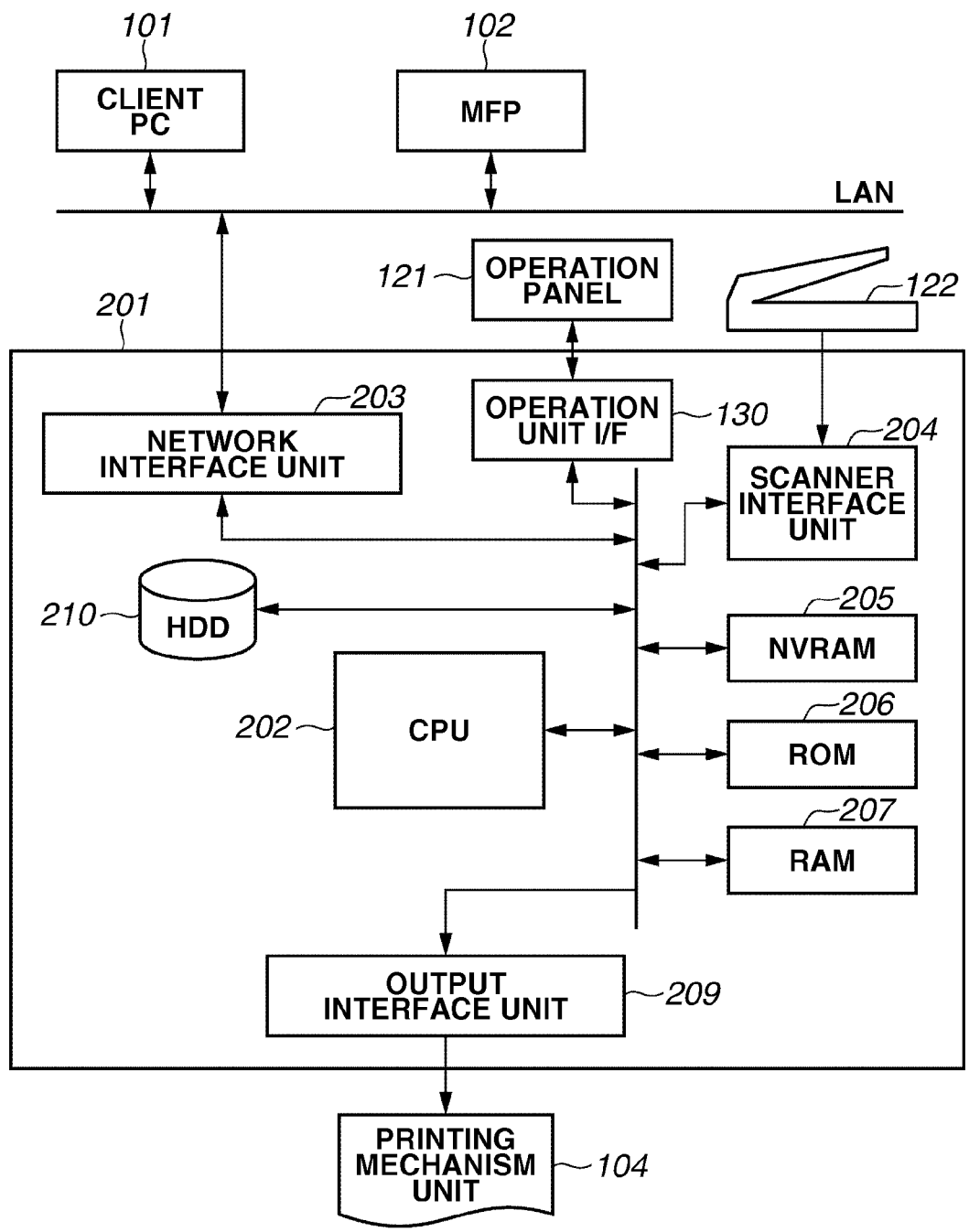
FIG. 2 is a block diagram illustrating a hardware configuration of a control unit of the MFP according to an exemplary embodiment of the present invention.

FIG. 2 is a block diagram illustrating a hardware configuration of the control unit 201 of the MFP 100 illustrated in FIG. 1.

A client personal computer (PC) 101 and an MFP 102 are connected to the MFP 100 via a local area network (LAN). According to the present exemplary embodiment, a plurality of nodes, such as a client PC and an MFP, can be located on the network.

A network interface unit 203 interfaces with the network for communication with other nodes on the network. For example, print data in PDL format sent from the client PC 101 is received via the network interface unit 203. The network interface unit 203 is capable of performing encrypted communication with other devices as needed.

The operation panel 121 is a user interface used by a user to control the MFP 100. The operation panel 121, which is used by the user as a control screen, includes a touch panel display and an operation key, and used to receive an operation instruction from the user. An operation unit interface 130 is an interface used for connecting a central processing unit (CPU) 202 and the operation panel 121. The operation panel 121 can be used for operation of other MFPs via the network interface unit 203. When a copy instruction is sent from the operation panel 121, the control unit 201 starts copy processing. That is, the control unit 201 performs image processing based on a video signal sent from the scanner unit 122 via a scanner interface unit 204 and transmits the processed signal to a print mechanism unit 104 via an output interface unit 209.

The above-described image processing includes, for example, conversion of reading resolution used for the scanner unit 122 into printing resolution used for the print mechanism unit 104, and rotation processing of the image, which is performed so that the orientation of the image matches a conveying direction of the print paper in the print mechanism unit 104.

A hard disk (HDD) 210 is configured to store image data, an integrated document, which is described below, and various databases.

Processing procedures of such processing performed by the CPU 202 are stored in a read-only memory (ROM) 206 or the HDD 210 in the form of a program. The CPU 202 loads the program into a random access memory (RAM) 207 and executes it. The RAM 207 is also used as a temporary storage area of image data when the image processing is performed. Further, data sent from the scanner unit 122 is stored in the RAM 207 and processed as needed.

A nonvolatile RAM (NVRAM) 205 is a non-volatile memory such as an electronically erasable and programmable read-only memory (EEPROM). The NVRAM 205 is configured to store various setting values of the MFP 100.

The MFP 100 illustrated in FIG. 1 includes the control unit 201, the operation panel 121, the scanner unit 122, and the printing mechanism unit 104.

Figure 3:
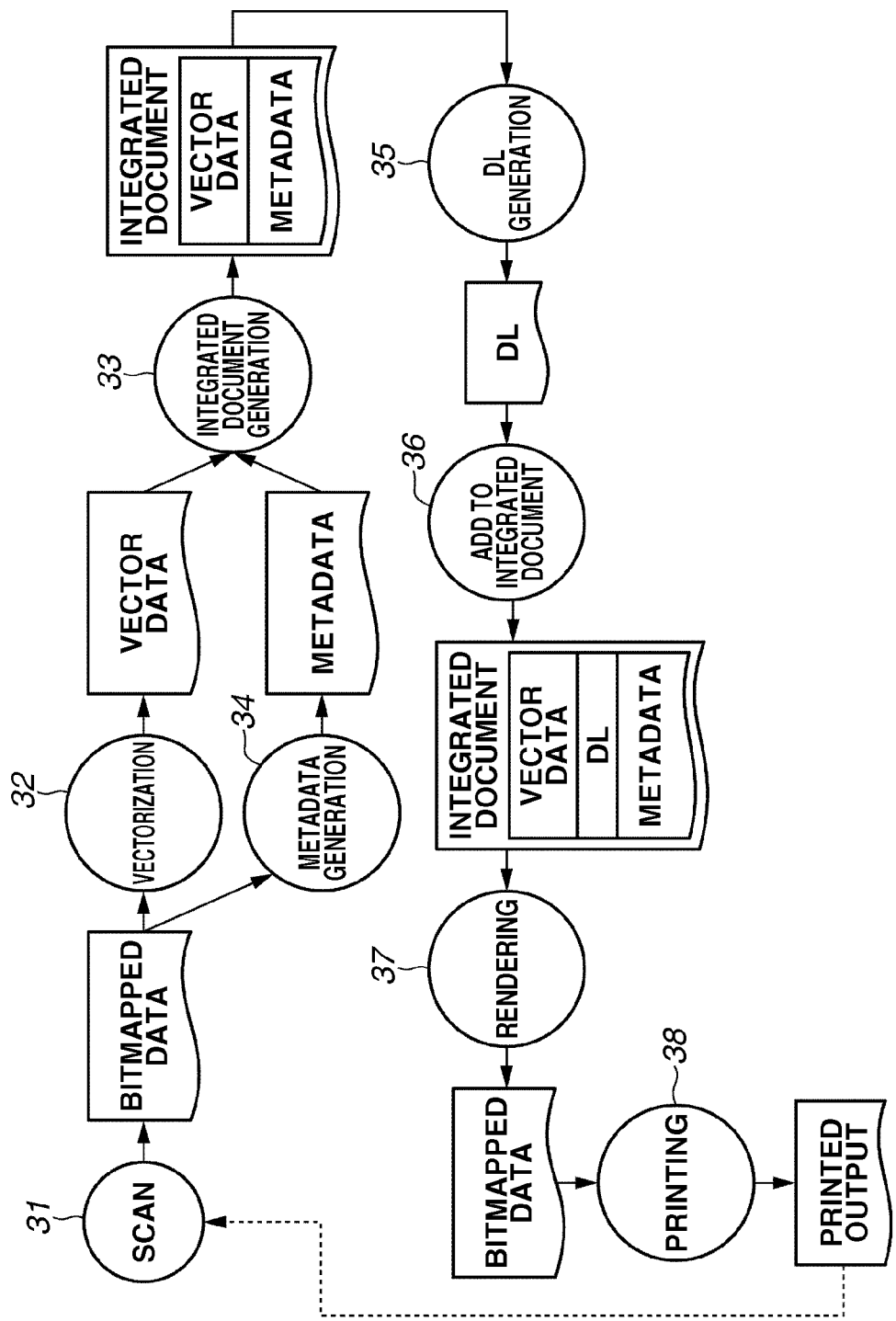
FIG. 3 is a data flow diagram illustrating an example of flow of data when a copy operation is performed by the MFP according to an exemplary embodiment of the present invention.

FIG. 3 is a data flow diagram illustrating an example of flow of data when a copy operation is performed by the MFP 100 according to the present exemplary embodiment. The copy operation is realized by the CPU 202 of the MFP 100 loading a program stored in the HDD 210 or the ROM 206 into the RAM 207 and executing the program to operate necessary hardware in the MFP 100.

First, image data of a paper document set on the scanner unit 122 is scanned by scan processing 31. Then, image data generated by scanning is converted into bitmapped data. Subsequently, vector data is generated from the bitmapped data by vectorization processing 32. At the same time, metadata is generated from the bitmapped data by metadata generation processing 34.

The vector data is generated according to vectorization of the bitmapped data. The metadata is secondary (accompanying) information of the bitmapped data. In other words, the metadata is secondary information (accompanying information) or a collection of secondary information related to the bitmapped data or an integrated document generated based on the bitmapped data. The metadata can be used, for example, as an index used for searching for an integrated document. Generation of the vector data and the metadata is described below.

Next, an integrated document in which the vector data is associated with the metadata is generated by integrated document generation processing 33. Subsequently, by DL generation processing 35, Display List (DL) is generated based on the vector data. The generated vector data is stored in the integrated document by processing 36. The DL is an intermediate code that is generated while the vector data is converted into a bitmapped image by rendering processing. Generally, rendering processing of a DL into a bitmapped image is performed in a shorter time compared to rendering processing of vector data into bitmapped data. The DL is transferred to rendering processing 37 to be rendered into a bitmapped image.

According to the present exemplary embodiment, data obtained by integrating both the vector data and the metadata and generated by the integrated document generation processing 33, or data obtained by integrating the vector data, the metadata, and the DL and generated by the processing 36 is referred to as an "integrated document".

The bitmapped image is recorded on a paper medium by print processing 38 and output as a printed output. The entire processing starting with the scanning processing 31 can be repeated by setting the printed output on a document exposure unit.

Further, the integrated document generated by the integrated document generation processing 33 can be stored in the HDD 210. In this way, a scanning operation can be performed.

In the copy operation illustrated in FIG. 3, the bitmapped data obtained by scanning the document is temporarily converted into an integrated document, and then reconverted into bitmapped data so that it can go through the printing process. Although it seems useless to vectorize the bitmapped data and then reconvert the vector data into bitmapped data, it has the following advantage. For example, in a copy operation that requires variable magnification processing, performing variable magnification processing of vector data in an integrated document after it is converted from bitmapped data eliminates the need for variable magnification processing of bitmapped data. Generally, image quality may be reduced by variable magnification processing of bitmapped data. However, by performing variable magnification processing of vector data vectorized from bitmapped data, a reduction in image quality can be prevented.

Figure 4:
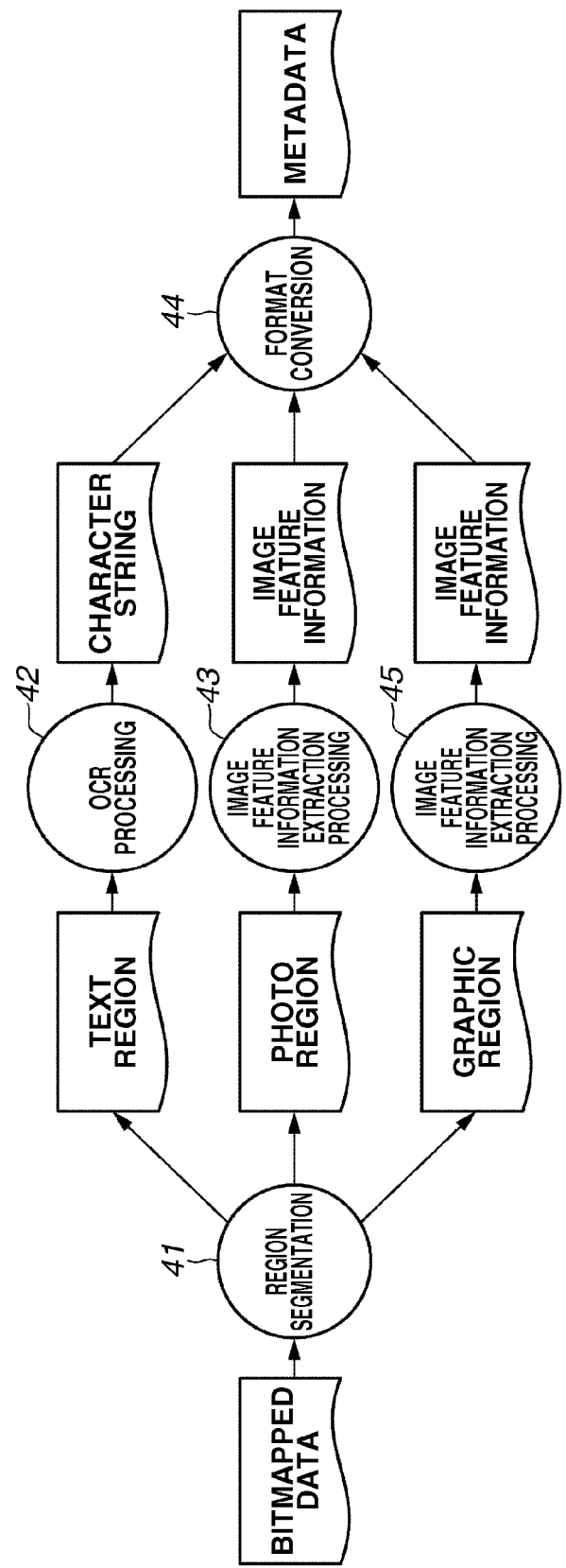
FIG. 4 is a data flow diagram illustrating an example of flow of data in metadata generation processing according to an exemplary embodiment of the present invention.

FIG. 4 is a diagram illustrating a specific data flow in the metadata generation processing 34 illustrated in FIG. 3. This processing is realized by the CPU 202 of the MFP 100 loading a program stored in the HDD 210 or the ROM 206 into the RAM 207 and executing the program to operate necessary hardware in the MFP 100.

First, a region segmentation of the bitmapped image is performed by region segmentation processing 41. The region segmentation is performed by analyzing the input bitmapped image data, segmenting the data into regions according to objects included in the image, and determining and classifying an attribute of each region. The attribute of the region is, for example, text (TEXT), photo (PHOTO), line (LINE), graphic (GRAPHIC), or table (TABLE).

Figure 6:
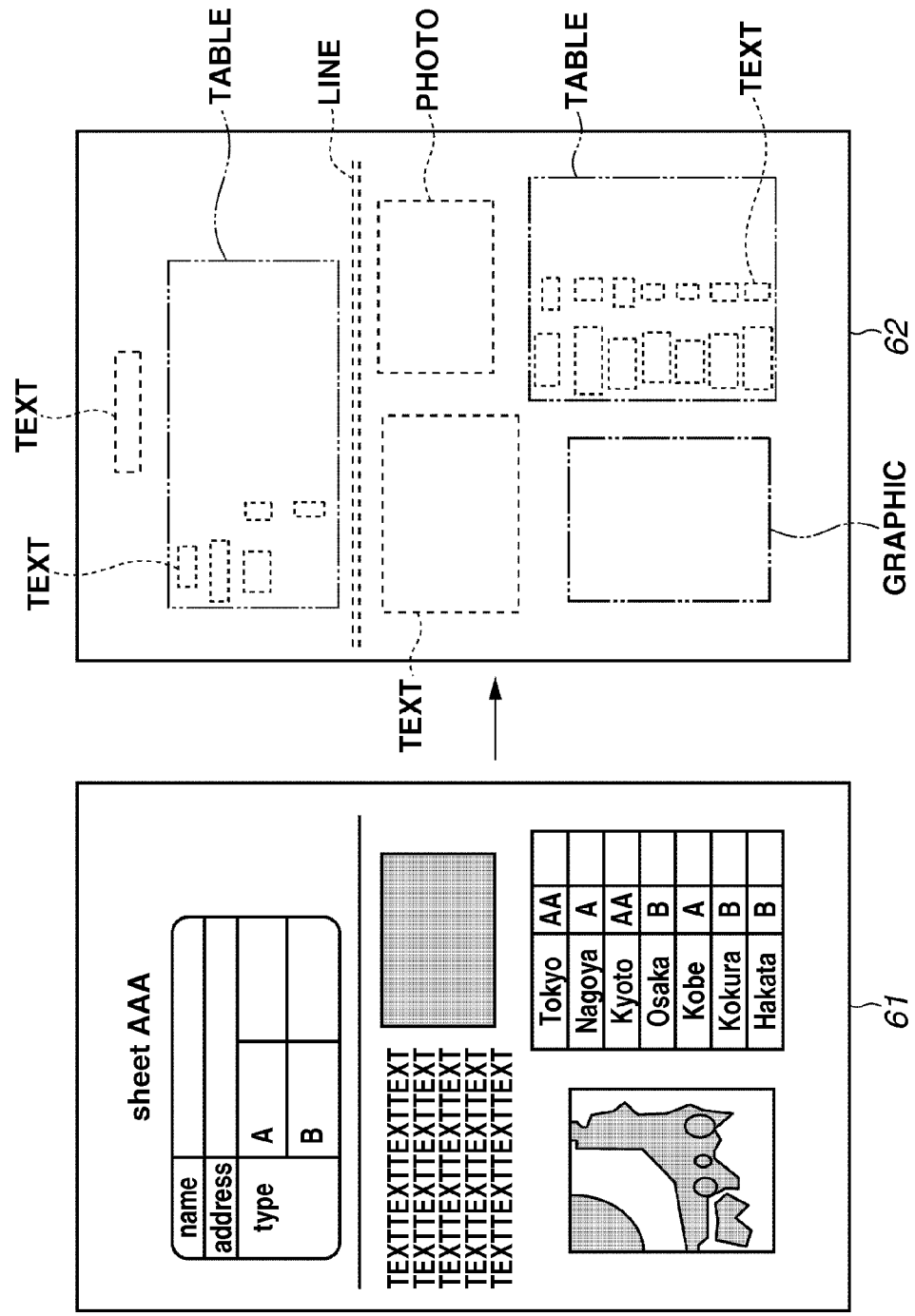
FIG. 6 illustrates an example of a result of region segmentation for image data.

FIG. 6 illustrates an example result of the region segmentation of an input image. A determination result 62 is a result of the region segmentation of an input image 61. In the determination result 62, each area surrounded by dotted lines indicates an object unit after the analysis of the image. A type of attribute given to each object is a result of the determination of the region segmentation.

Among the regions classified by the attributes, regions having a text attribute are character-recognized by OCR processing 42 and converted into a character string. The character string is a string of characters that are printed on paper.

On the other hand, the photo attribute region in the regions classified by the attribute is converted into image feature information by image feature information extraction processing 43. The image feature information is a character string that expresses a feature of an image, such as a "flower" or a "face". Further, the graphic attribute is also converted into image feature information by image extraction processing 45. A conventional image processing technique using image feature value detection or face recognition can be used for extracting the image feature information. The image feature value is a frequency or a density of pixels included in an image.

Data format of the generated character string and image feature information is converted by format conversion processing 44 so that metadata is generated.

Figure 5:
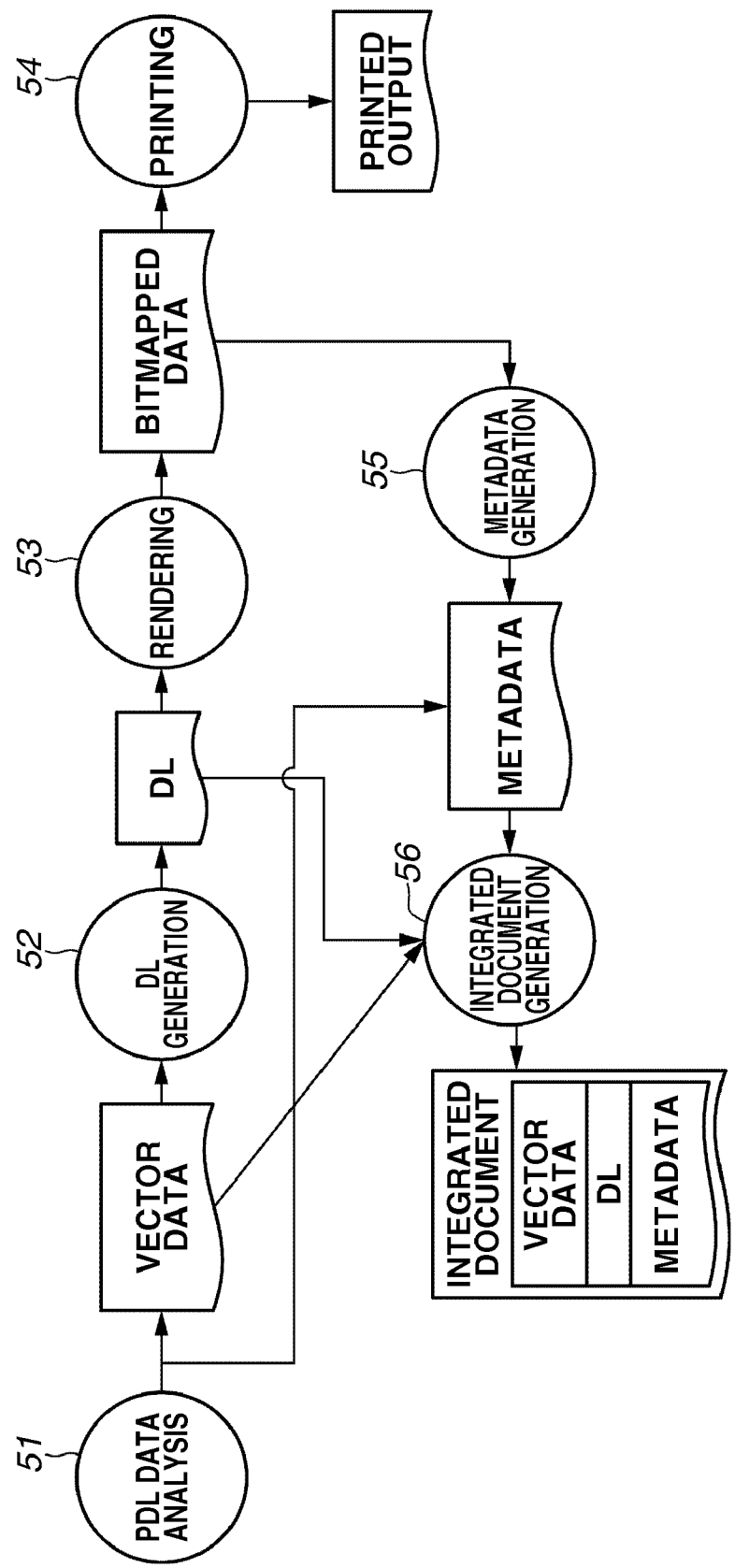
FIG. 5 is a data flow diagram illustrating an example of flow of data when page description language (PDL) printing is executed according to an exemplary embodiment of the present invention.

FIG. 5 is a diagram illustrating a data flow during PDL printing. The PDL printing is a printing operation, which is performed when printing is instructed from application software in the PC, and a PDL generated by the printer driver on the PC is received and printed by the MFP. The PDL printing is realized by the CPU 202 of the MFP 100 loading a program stored in the HDD 210 or the ROM 206 into the RAM 207 and executing the program to operate necessary hardware in the MFP 100.

First, the received PDL data is analyzed by PDL data analysis processing 51 so that vector data is generated based on the PDL data. Next, by DL generation processing 52, DL data is generated from the vector data. The generated DL is stored in the integrated document but is also sent to rendering processing 53 and rasterized into a bitmapped image. The bitmapped image is recorded on a paper medium by print processing 54 and is output as a printed output.

The vector data and the DL generated in this process are stored in the integrated document during integrated document generation 56.

Further, from the bitmapped image generated by the rendering processing 53, metadata, such as a character string or image feature information, is generated by metadata generation processing 55. The processing of metadata generation is described above referring to FIG. 4. The metadata is included in the integrated document.

A PDL having character string information is included in the various types of PDL. The PDL, for example, includes LBP Image Processing System (LIPS) and PostScript® (PS). If the PDL includes character string information, metadata can be generated by extracting the character string from the PDL during the PDL analysis. Then, the metadata is included in the integrated document.

Next, integrated document generation processing and print processing will be described referring to FIGS. 7 and 8.

Figure 7:
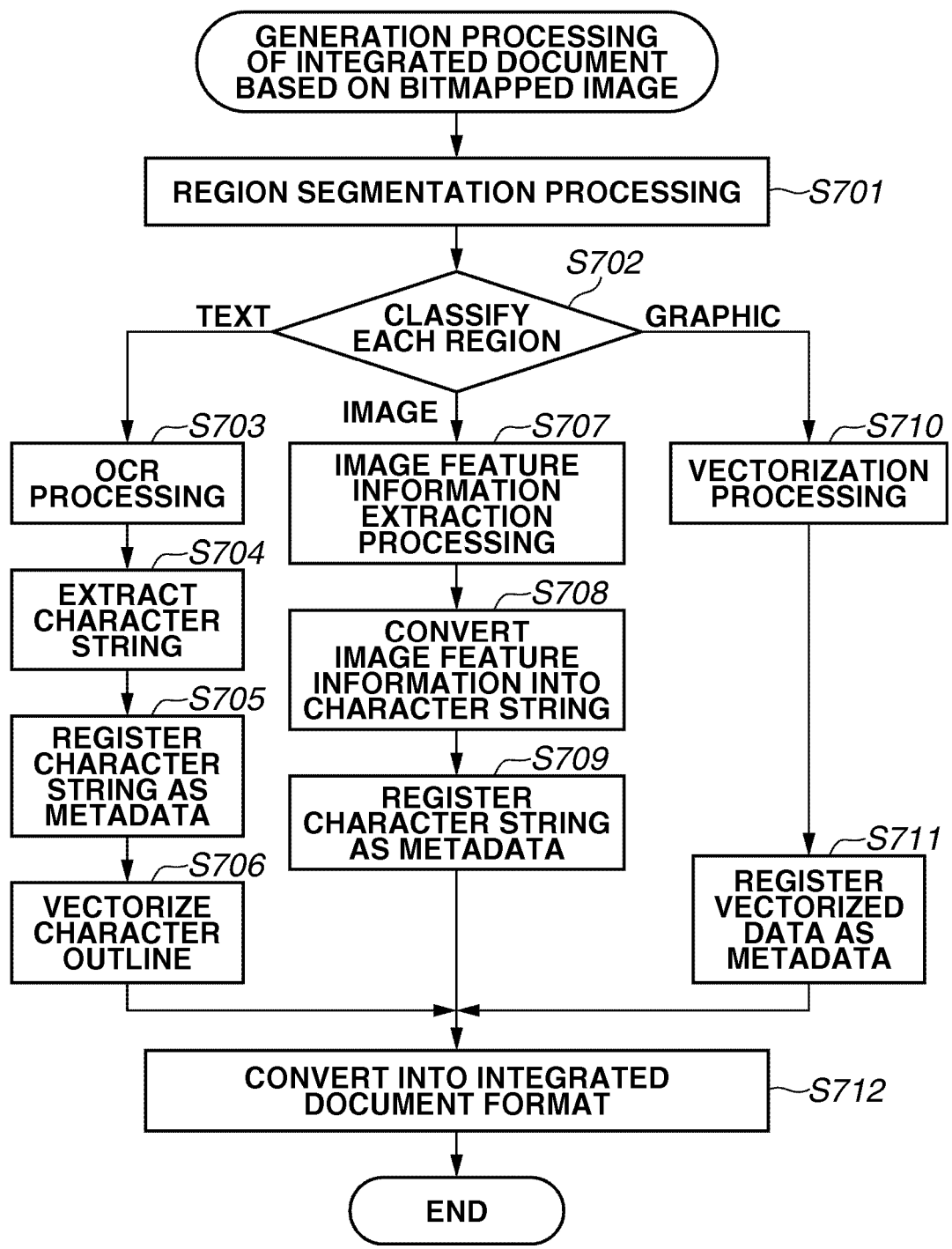
FIG. 7 is a flowchart illustrating an example of integrated document generation processing according to an exemplary embodiment of the present invention.

The flowchart in FIG. 7 illustrates the integrated document generation processing according to the present exemplary embodiment. According to this processing, a document including vector data, DL, and metadata is generated based on the bitmapped data. This processing corresponds to the vectorization processing 32 through the processing 36 in FIG. 3. Further, the bitmapped data corresponds to bitmapped data obtained, for example, by the scan processing 31 in FIG. 3. The process in the flowchart of FIG. 7 is executed by the CPU 202 of the MFP 100.

In step S701, the CPU 202 executes the aforementioned region segmentation processing of the input image data. In step S702, the CPU 202 classifies a type or attribute of each region into TEXT, GRAPHIC, or IMAGE. The TEXT, GRAPHIC, and IMAGE go under different processing. Although the attributes are classified into TEXT, PHOTO, LINE, GRAPHIC, and TABLE in FIG. 6, they are classified into three types, TEXT, GRAPHIC, and IMAGE in FIG. 7. Image regions can also be classified according to a different classification method. If the region attribute is TEXT, the process proceeds to step S703, where the CPU 202 executes OCR processing. Then, the CPU 202 extracts a character string in step S704, registers the extracted character string as metadata in step S705, and converts a recognized character outline into vector data in step S706.

The metadata generated from the character string is a collection of character codes. The character code is information necessary in a keyword search. However, although the character code is recognized in the OCR processing, font types, such as "Mincho" or "Gothic", character size, such as "10 pt" or "12 pt", and font attributes, such as "italic" or "bold", are not recognized. Thus, not the character code but the character outline is stored as vector data for rendering. By converting an outline of a character image into vector data in step S706, font type, character size, and font attribute of a character in a bitmapped image can be reproduced without recognition of its font type, character size, and font attribute.

On the other hand, if the region attribute is IMAGE in step S702, the process proceeds to step S707. In step S707, the CPU 202 extracts image feature information. In this step, a feature of an image is detected by using a conventional image recognition technique, such as the image feature value detection or the face recognition, and image feature information of the image is extracted. In step S708, the CPU 202 converts the detected image feature information into a character string. This conversion will be performed easily if a correspondence table that contains image feature information and character string is prepared in advance. In step S709, the CPU 202 registers the character string as metadata.

The image classified in the region attribute of IMAGE is not converted into vector data and the image data is included as it is as vector data in the integrated document.

If the region attribute is GRAPHIC in step S702, the process proceeds to step S710. In step S710, the CPU 202 vectorizes the data. In step S711, the CPU 202 registers the metadata obtained by converting image feature information into a character string, which is similar to the processes in steps S707 and S708. In step S712, the CPU 202 converts the vector data and the metadata, which is generated from each region, into an integrated document format. Then, the process ends.

It is to be noted that a display list (DL) can be generated from the vector data generated by the vector processing in step S706 or S710 and can be included in the integrated document.

Figure 8:
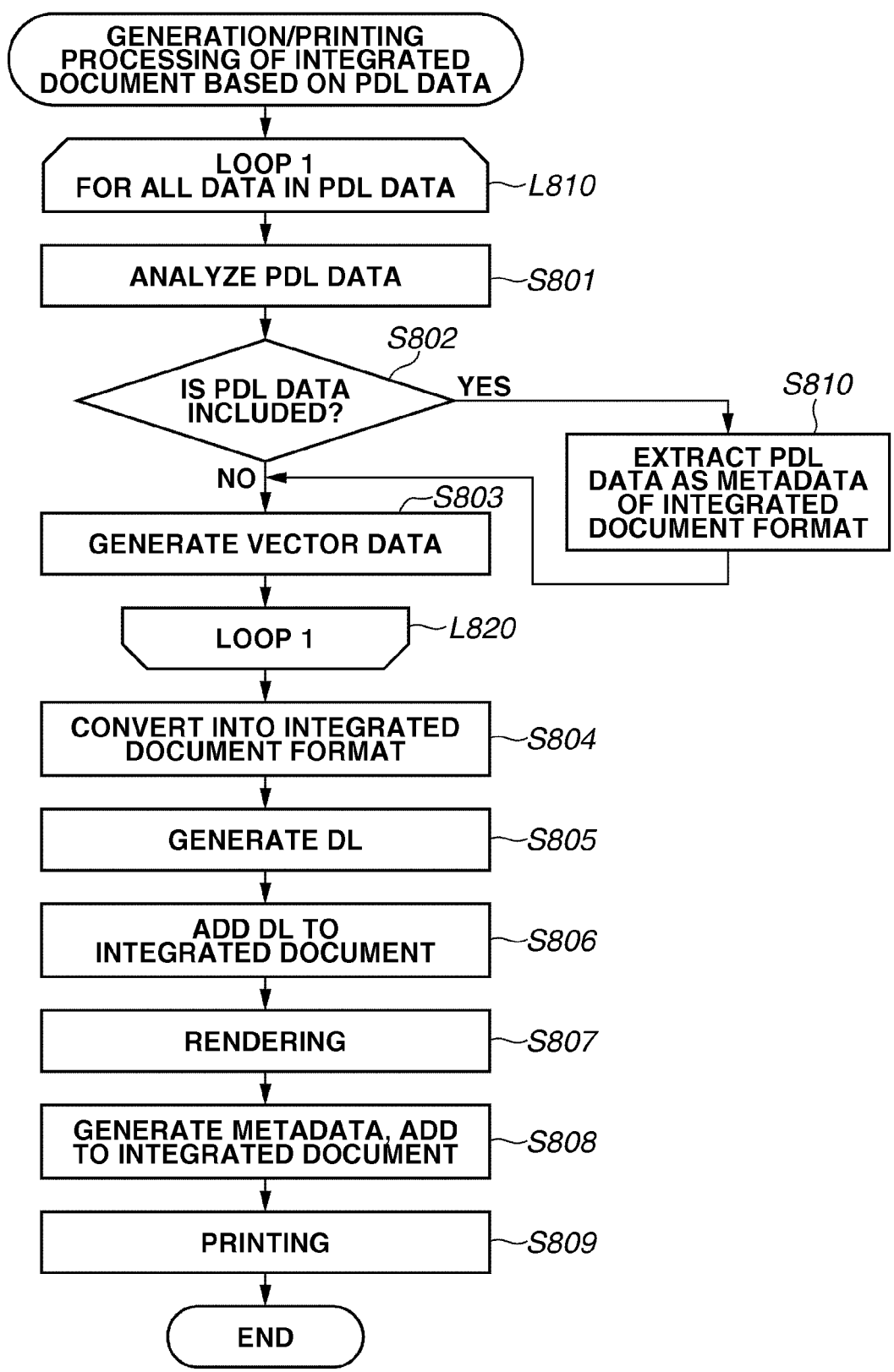
FIG. 8 is a flowchart illustrating an example of integrated document generation processing using PDL data according to an exemplary embodiment of the present invention.

FIG. 8 is a flowchart illustrating an example of generation processing of an integrated document based on PDL data and print processing of the generated integrated document. According to this processing, PDL data sent from an external device is received, an integrated document is generated based on the received PDL data, and the generated integrated document is printed out. This process corresponds to the data processing illustrated in FIG. 5. The process in FIG. 8 is executed by the CPU 202 of the MFP 100.

Processing in loop 1 between L810 and L820 are repeated for all data in the received PDL data. In step S801, the CPU 202 analyzes the PDL data. In step S802, the CPU 202 determines whether metadata such as character string information is included in the PDL data from the result of the analysis. If metadata is included in the PDL data (YES in step S802), then the process proceeds to step S810. In step S810, the CPU 202 extracts the metadata in the PDL data, and then the process proceeds to step S803.

On the other hand, if the analyzed PDL data does not include metadata such as character string information, and is data such as rendering command (NO in step S802), then the process proceeds to step S803. In step S803, the CPU 202 converts the data into vector data. Then, in step S804, the CPU 202 converts the vector data into data in the integrated document format.

Next, in step S805, the CPU 202 generates a DL based on the vector data, and adds the generated DL to the integrated document in step S806. In step S807, the CPU 202 executes rendering processing of the vector data in the integrated document. Further, in step S808, the CPU 202 generates metadata from the bitmapped data obtained from the rendering processing and adds the metadata to the integrated document together with the metadata extracted in step S810. In step S809, the CPU 202 executes print processing on a paper medium. Then, the processing ends.

Figure 9:
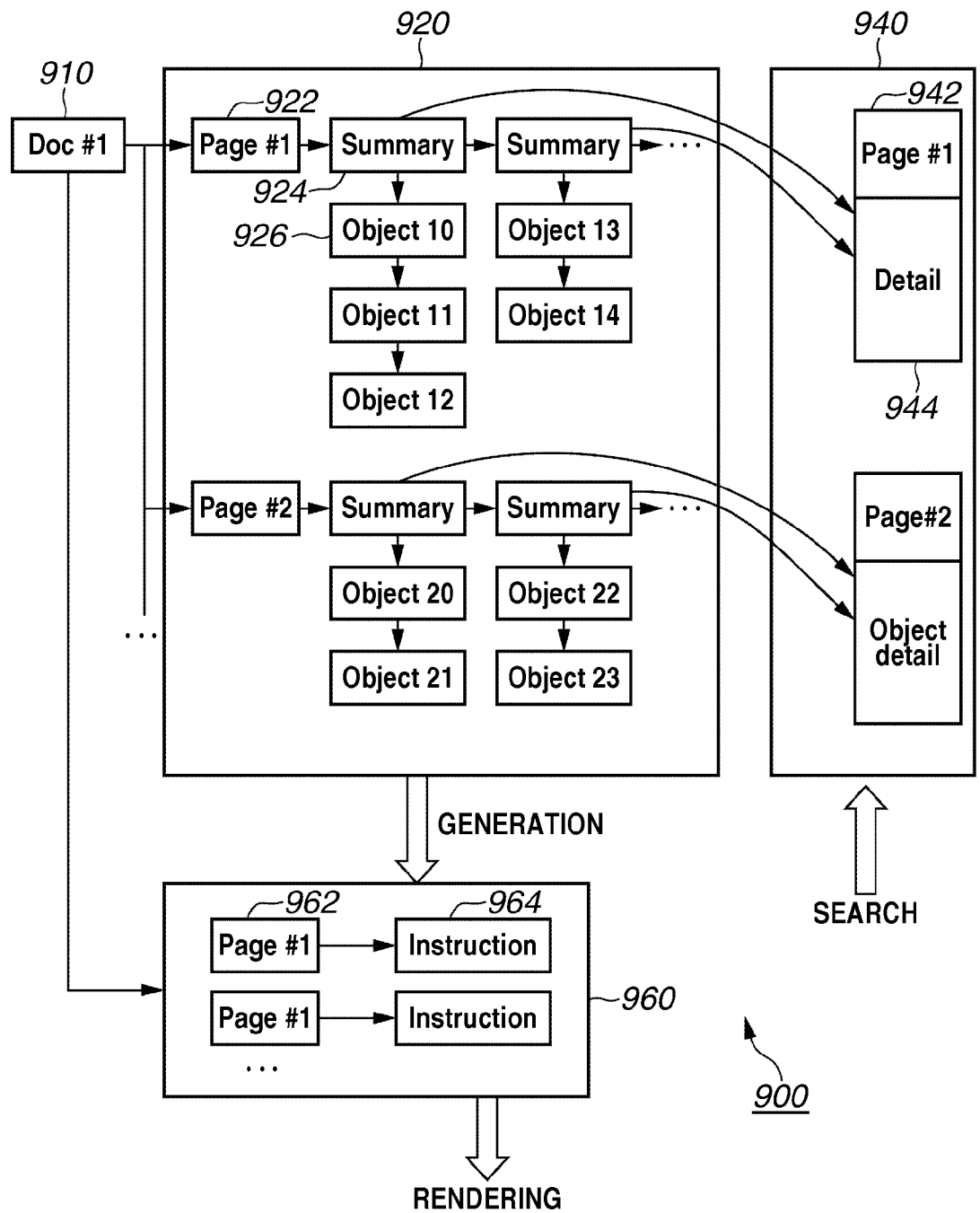
FIG. 9 illustrates an example of a structure of an integrated document according to an exemplary embodiment of the present invention.

FIG. 9 illustrates an example of a structure of the integrated document.

An integrated document 900 is a plurality of pages of data. In a broad categorization, vector data 920, metadata 940, and DL 960 constitute the integrated document 900. The integrated document 900 has a hierarchical structure with a document header 910 at the top. The vector data 920 includes a page header 922, summary information 924, and an object 926. The metadata 940 includes page information 942 and detailed information 944. The DL 960 includes a page header 962 and a rendering instruction 964.

Since the data location of the vector data 920 and the data location of the DL 960 are described in the document header 910, the vector data 920 is associated with the DL 960 by the document header 910.

The vector data 920 is generated by executing at least one of a plurality of processing, such as character recognition processing, outline processing, and figure recognition processing of bitmapped data. The vector data (vectorized data) is an image that defines a formula that serves as a complement to a plurality of pixels that make up a straight line or a curve obtained by the CPU 202 executing any of the above-described processing. According to the present exemplary embodiment, bitmapped data having vectorized data in its portion is also referred to as vector data.

Since the vector data 920 is rendering data that is independent of print resolution, layout information, such as page size and orientation, is included in the page header 922. An object 926, which is rendering data, such as line, polygon, and Bezier curve, is linked one by one to the summary information 924. As a whole, a plurality of objects 926 are linked to the summary information 924. The summary information 924 describes a feature of the plurality of objects as a whole and includes attribute information of a segmented region, which is described with reference to FIG. 6. A plurality of objects linked to one piece of summary information has the same image attribute.

The metadata 940 is not directly linked to the rendering process and is additional information mainly used for search. Page information, such as information indicating whether the metadata is generated from bitmapped data or from PDL data, is included in the region of the page information 942. Further, OCR information or a character string (character code string), which is generated as image information, is included in the detailed information 944.

Further, since metadata is linked to the summary information 924 of the vector data 920, the detailed information 944 of the metadata 940 can be searched for from among the summary information 924.

The DL 960 is an intermediate code, which is used by a renderer when the renderer rasterizes data into bitmapped data. The page header 962 includes a management table of rendering information (instruction) in a page, and the instruction 964 includes rendering information dependent on print resolution.

Figure 10A:
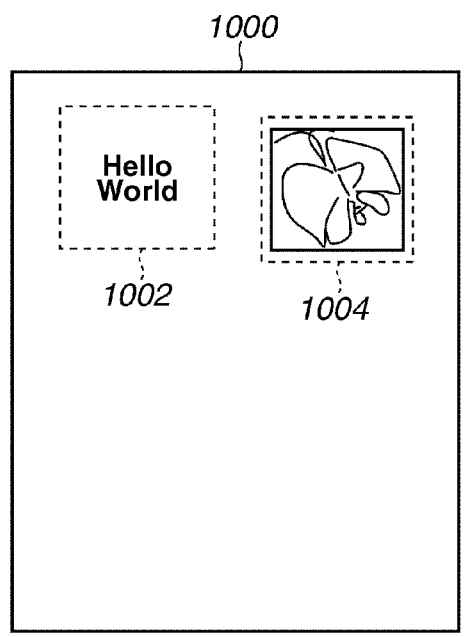
FIGS. 10A and 10B illustrate an example of the integrated document according to an exemplary embodiment of the present invention.
Figure 10B:
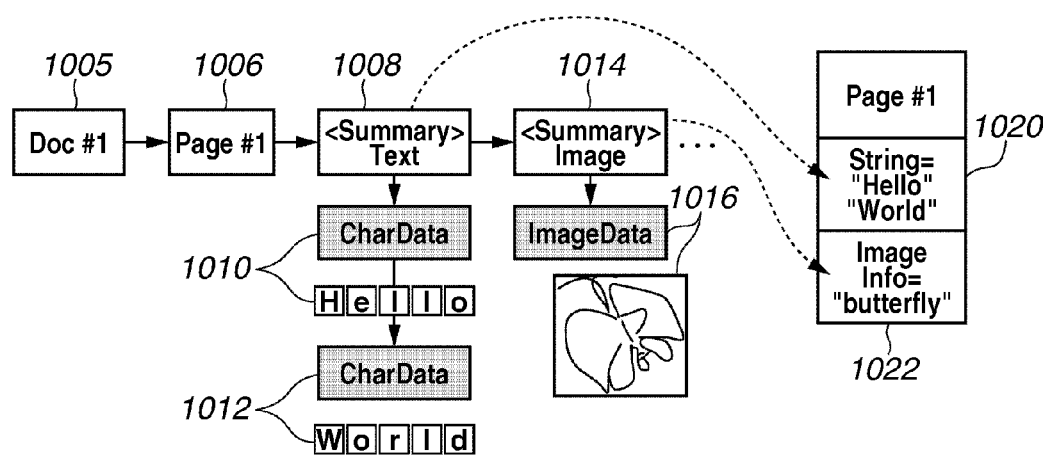

FIGS. 10A and 10B illustrate a specific example of an integrated document. FIG. 10B illustrates an integrated document that is generated based on a bitmapped image illustrated in FIG. 10A.

A bitmapped image 1000 in FIG. 10A includes a text region (TEXT) 1002 and an image region (IMAGE) 1004, which is a photograph of a butterfly. A data structure of an integrated document including data generated from the bitmapped image is illustrated in FIG. 10B.

In FIG. 10B, a page header 1006, summary information 1008 of the "TEXT" region, and summary information 1014 of the "IMAGE" region are linked to a document header 1005. Character outlines "H,e,l,l,o" (object 1010) and "W,o,r,l,d" (object 1012) are linked to the summary information 1008 of the "TEXT" region as vector data.

In addition, metadata 1020 including character code strings "Hello" and "World" is linked to the summary information 1008. Further, a photographic image of a butterfly (object 1016) in, for example, Joint Photographic Experts Group (JPEG) format is linked to the summary information 1014 of the "IMAGE" region. Furthermore, image feature information 1022 including "butterfly" is referred to from the summary information 1014 of the "IMAGE" region.

For example, if an integrated document is searched for using a keyword "World", the search will be made by acquiring vector page data sequentially from a document header and then searching metadata (in FIG. 10B, the metadata 1020) that is linked to the summary information (in FIG. 10B, the summary information 1008) of the "TEXT" region from among the summary information linked to the page header.

Figure 11A:
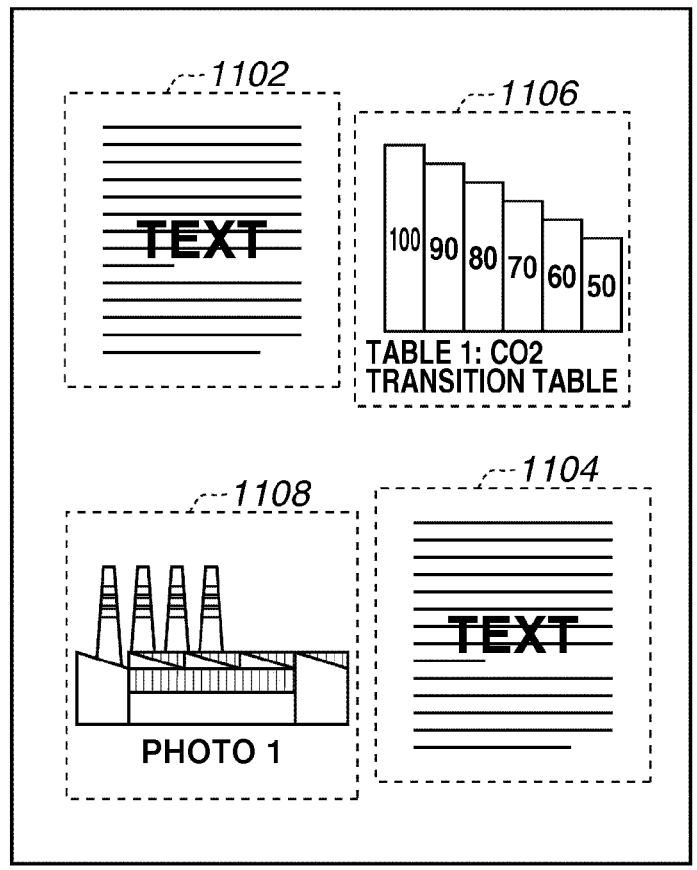
FIGS. 11A and 11B illustrate another example of the integrated document according to an exemplary embodiment of the present invention.
Figure 11B:
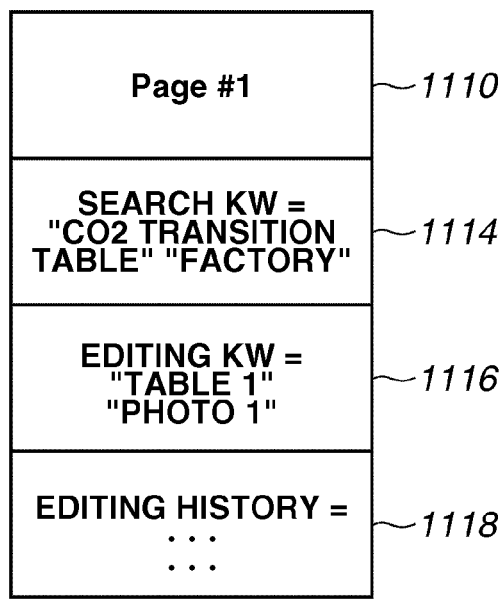

FIGS. 11A and 11B illustrate another example of the integrated document according to the present exemplary embodiment. Types of metadata in FIGS. 11A and 11B are different from those illustrated in FIGS. 10A and 10B.

The image in FIG. 11A includes "TEXT" regions 1102 and 1104, a "GRAPHIC" region (a graph 1106), and an "IMAGE" region (photograph of a factory as a photograph 1108). FIG. 11B illustrates a metadata portion of the data structure when the image in FIG. 11A is converted into data in the integrated document format. The metadata in FIG. 11B includes a page header 1110, a search keyword 1114, an editing keyword 1116, and an editing history 1118.

The search keyword 1114 is a region which includes a keyword that can be used for search as metadata of the image in FIG. 11A. Generally, a search keyword includes a feature of the document. If the image data is what is illustrated in FIG. 11A, "CO2 transition table" of the "GRAPHIC" region and "factory" of the "IMAGE" region will be the search keywords. These keywords are included in the region of the search keyword 1114.

The editing keyword 1116 is a region which includes a keyword that can be used as an editing target, as metadata of the image in FIG. 11A. Generally, an object that represents a feature of a document is not often changed. For example, in a document regarding "warming event", if a keyword "warming" is changed to a different keyword, the keyword will no longer be appropriate for the present document. Thus, the editing keyword is generally not changed. On the other hand, since a value of a graph or a table is updated, a graph of a table is often regarded as an editing target.

Further, a word such as "figure" in a title of a figure is frequently changed, for example, into "Fig.". Thus, editable terms and figures are included in the editing keyword 1116 as search keywords for editing. "Table 1" and "Photograph 1" in FIG. 11A are included in the editing keyword 1116 in the metadata illustrated in FIG. 11B.

Further, the editing history 1118 can be included in the metadata in FIG. 11B. Since the editing history is recorded as metadata, the user can understand which keyword has been used as an editing target and determine which keyword can be used as an editing target keyword.

Figure 12:
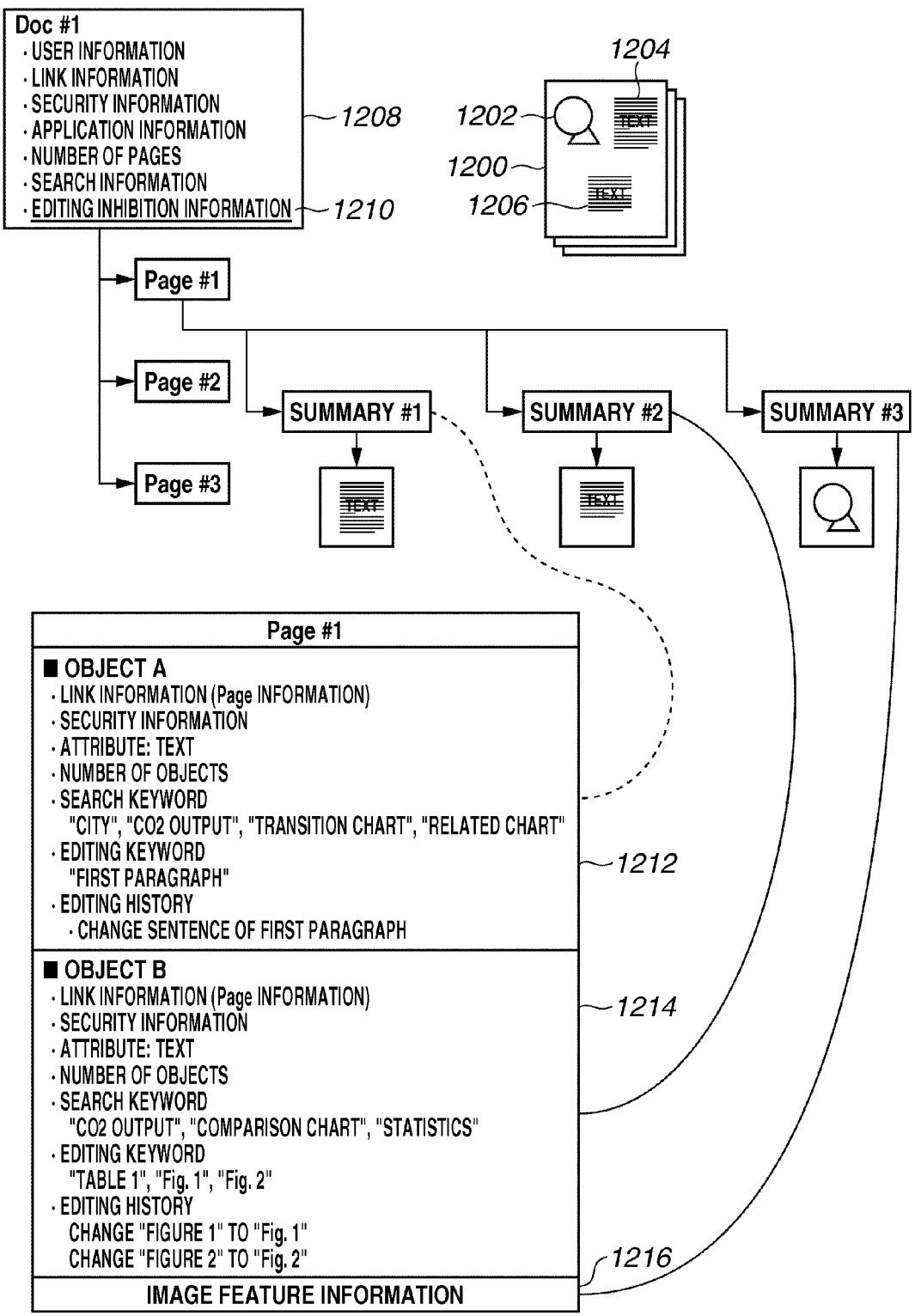
FIG. 12 illustrates an example of editing processing of the integrated document according to an exemplary embodiment of the present invention.

FIG. 12 illustrates an example of editing processing of an integrated document.

When image data 1200, which contains 3 pages of image data, is converted into an integrated document, an integrated document having a data structure determined by a document header 1208 is generated. Three regions, which are an "IMAGE" object 1202, a "TEXT" object 1204, and a "TEXT" object 1206, constitute the first page of the image data 1200.

The integrated document including a document header 1208 includes summary information, an object, and metadata as described above. It is to be noted that the integrated document in FIG. 12 includes editing inhibition information 1210 in the document header 1208. By setting editing inhibition "ON" in the editing inhibition information in the document header 1208, editing of all objects in the integrated document can be inhibited. Further, by setting editing inhibition information in a page header or summary information, editing restriction by the page or by the object is feasible. The editing inhibition information is generally realized by a flag. However, a password can also be used for canceling the editing inhibition.

Metadata 1212 is metadata that corresponds to the "TEXT" object 1204. The metadata 1212 includes a search keyword region, an editing keyword region, and an editing history region. Each of these regions included in the metadata 1212 has a group of character strings as metadata. In the metadata 1212, for example, terms such as "city", "CO2 output", "transition chart", and "related chart" are included as search keywords. Similarly, "first paragraph" is included as the editing keyword and "change sentence of first paragraph" is included as an editing history.

Metadata 1214 is metadata corresponding to the "TEXT" object 1206. In the metadata 1214, terms such as "CO2 discharge amount", "comparison chart", and "statistics" are included as search keywords. Similarly, "Table 1", "FIG. 1", and "FIG. 2" are included as editing keywords, and changes from "FIG. 1" and "FIG. 2" to "FIG. 1" and "FIG. 2" are included as an editing history.

Metadata 1216 is metadata corresponding to the "IMAGE" object 1202. Image feature information of the "IMAGE" object 1202 is included in the metadata 1216.

Information such as security information can be included in the metadata 1212, 1214, and 1216. The security information includes information used for identifying a user who can access the object or password information used for allowing the user to access the object. The integrated document includes various types of metadata other than the above-described metadata.

As described above, the integrated document includes various types of metadata. In the plurality of types of metadata, information such as an editing keyword or editing history is added each time the integrated document is edited, and accordingly the metadata is bloated. If the information amount is increased, convenience in searching for the integrated document will be improved. However, it also leads to increasing a storage area used for storing the integrated document. Further, since the data size of the integrated document becomes larger along with the increase in the volume of metadata, transmission efficiency in sending an integrated document to an external device will be decreased. Accordingly, a process to appropriately delete the bloated metadata becomes necessary.

Figure 13:
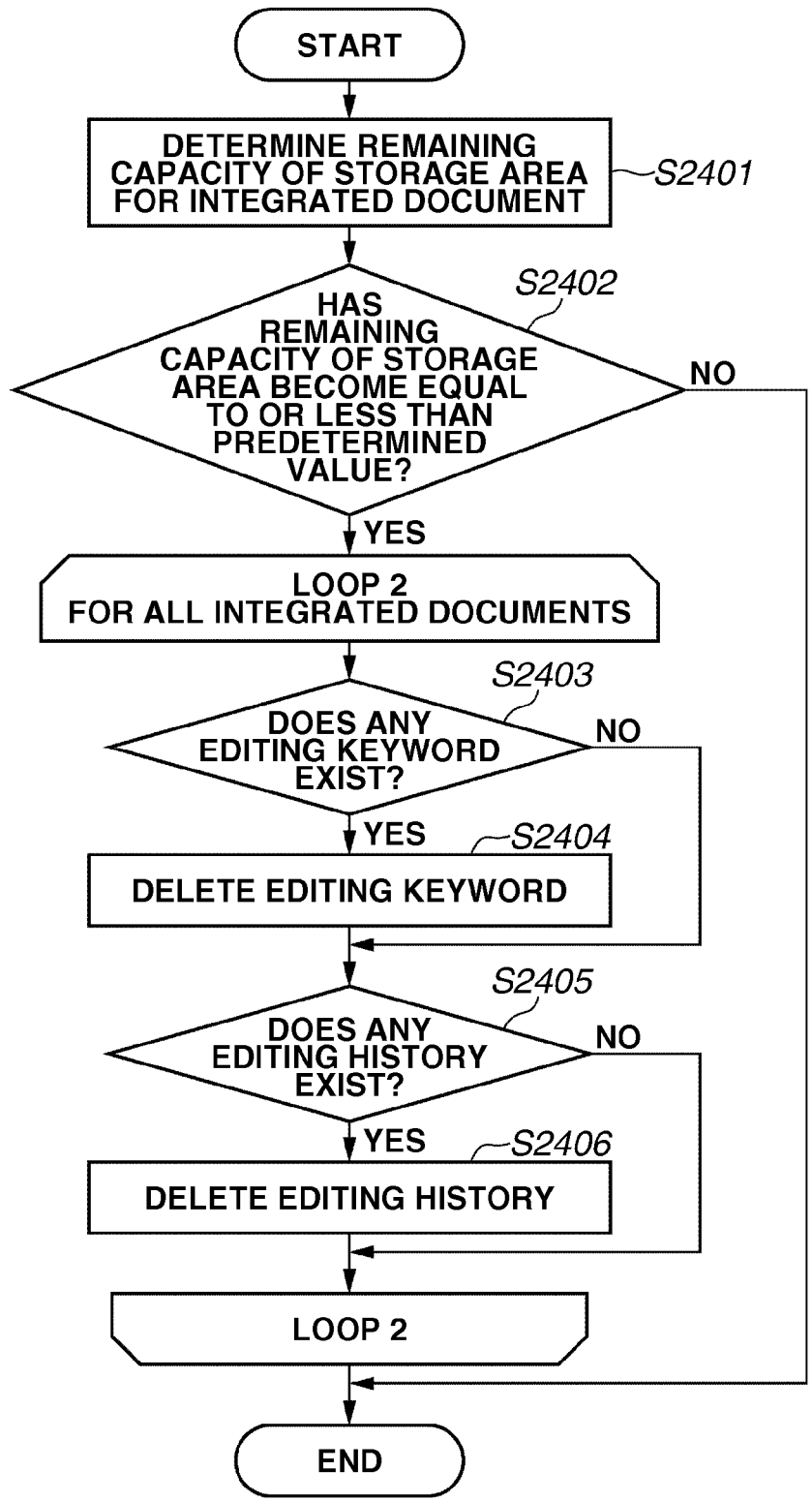
FIG. 13 is a flowchart illustrating an example of deletion processing of the integrated document according to an exemplary embodiment of the present invention.

FIG. 13 is a flowchart illustrating an example of deletion processing of metadata performed in the MFP 100 according to the present exemplary embodiment. The process in the flowchart is executed by the CPU 202 of the MFP 100.

In step S2401, the CPU 202 determines a remaining capacity of a storage area used for storing the integrated document in the MFP 100. The storage area used for storing the integrated document is arranged in the HDD 210. The whole or a predetermined area of the storage area of the HDD 210 can be used as the storage area for the integrated document.

In step S2402, the CPU 202 determines whether the remaining capacity of the storage area has become equal to or less than a predetermined value. If the remaining capacity has become equal to or less than the predetermined value (YES in step S2402), then the CPU 202 executes a loop 2, which includes processes from steps S2403 through S2406. If the remaining capacity is above the predetermined value (NO in step S2402), then the process ends. The CPU 202 executes the loop 2 on all of the integrated documents stored in the HDD 210.

In step S2403, the CPU 202 focuses attention on one integrated document and determines whether any editing keyword is included in the metadata of the focused integrated document. If an editing keyword is included (YES in step S2403), then the process proceeds to step S2404. If an editing keyword is not included (NO in step S2403), then the process proceeds to step S2405. In step S2404, the CPU 202 deletes the editing keyword in the focused integrated document. Then the process proceeds to step S2405.

In step S2405, the CPU 202 determines whether any editing history is included in the metadata of the focused integrated document. If an editing history is included (YES in step S2405), then the process proceeds to step S2406. If no editing history is included (NO in step S2405), then the processing in loop 2 for the focused integrated document ends. In step S2406, the CPU 202 deletes the editing history of the focused integrated document. When the processing in the loop 2 ends, the loop 2 is carried out for another integrated document. When the processing in the loop 2 is carried out for all of the integrated documents, then the process ends.

By executing the process in FIG. 13, the editing keyword and the editing history information are deleted from a portion of metadata when the remaining capacity of the storage area for the integrated documents becomes low. In this way, a free space of the storage area can be increased without deleting any integrated document itself.

Figure 14:
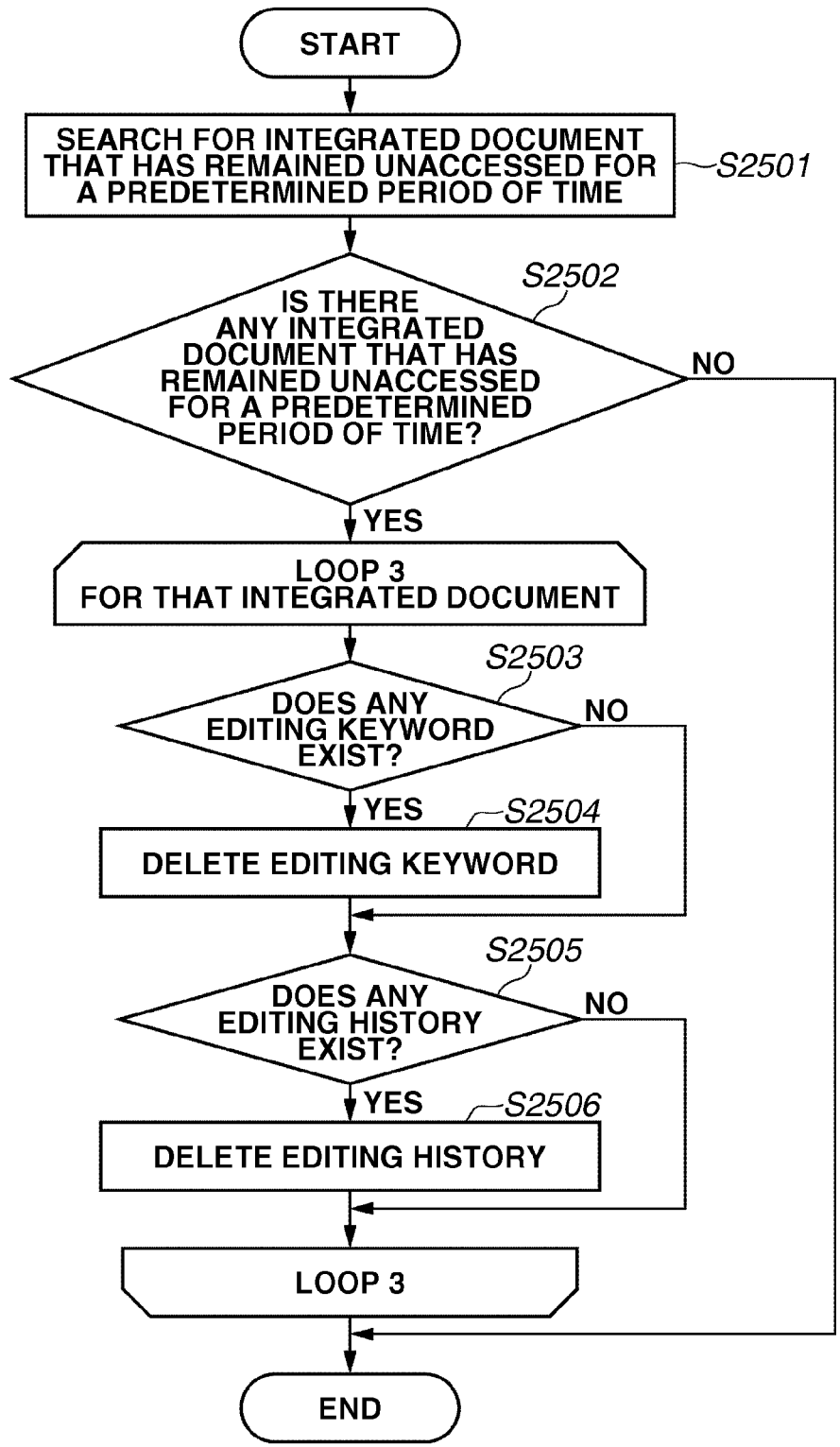
FIG. 14 is a flowchart illustrating another example of deletion processing of the integrated document according to an exemplary embodiment of the present invention.

FIG. 14 is a flowchart illustrating another example of deletion processing of metadata performed in the MFP 100 according to the present exemplary embodiment. The process in the flowchart is executed by the CPU 202 of the MFP 100. The MFP 100 can execute both the processes in the flowcharts illustrated in FIGS. 13 and 14.

In step S2501, the MFP 100 searches for an integrated document that has remained unaccessed for a predetermined period of time from among the integrated documents stored in the HDD 210. The "access" in this context includes a case where a user of the MFP 100 operates the operation panel 121, designates an integrated document in the HDD 210, or prints, transmits, edits, or displays the designated integrated document. Further, the "access" also includes a case where the client PC 101 or an external device such as the MFP 102 designates an integrated document in the HDD 210, or prints, transmits, edits, or displays the designated integrated document.

In step S2502, the CPU 202 determines whether any integrated document that has remained unaccessed for a predetermined period of time exists according to a result obtained from the search in step S2501. If such an integrated document does not exist (NO in step S2502), then the CPU 202 determines that an integrated document having metadata to be deleted does not exist, and the process ends. On the other hand, if the CPU 202 determines that an integrated document that has remained unaccessed for a predetermine period of time exists (YES in step S2502), then the CPU 202 executes a loop 3, which includes processes from steps S2503 through S2506, for such integrated documents.

In step S2503, the CPU 202 focuses attention on one of the integrated documents that have remained unaccessed in a predetermined period of time and determines whether any editing keyword is included in the metadata of the focused integrated document. If an editing keyword is included in the metadata (YES in step S2503), then the process proceeds to step S2504. In step S2504, the CPU 202 deletes the editing keyword, and the process proceeds to step S2505. On the other hand, if no editing keyword is included in the metadata (NO in step S2503), then the process proceeds to step S2505.

In step S2505, the CPU 202 determines whether any editing history is included in the metadata of the focused integrated document. If an editing history is included (YES in step S2506), then the process proceeds to step S2506. In step S2506, the CPU 202 deletes the editing history of the focused integrated document, and the processing in the loop 3 ends. If no editing history is included (NO in step S2506), then the processing in the loop 3 ends.

When the processing in the loop 3 ends, the loop 3 is carried out for another integrated document. When the processing in the loop 3 is carried out for all of the integrated documents that have remained unaccessed for a predetermined period of time, then the process ends.

The flowchart in FIG. 14 can be started when the remaining capacity of the integrated document storage area in the HDD 210 becomes equal to or less than the predetermined value.

By executing the flowchart in FIG. 14, an editing keyword or editing history included in the metadata of an integrated document that has remained unaccessed for a predetermined period of time, in other words, an editing keyword or editing history included in the metadata of an integrated document having low probability of being used, is deleted. In this way, wasting of a storage area for an integrated document can be prevented.

FIG. 15 is a flowchart illustrating an example of metadata deletion processing of the MFP when a job is executed according to the present exemplary embodiment. The process in the flowchart is executed by the CPU 202 of the MFP 100. The MFP 100 can execute the processes illustrated in the flowcharts in FIGS. 13, 14, and 15.

In step S2601, the CPU 202 receives an execution instruction of a job for the integrated document stored in the HDD 210 of the MFP 100. Types of such a job are local printing used for printing out an integrated document by the MFP 100, remote printing used for transmitting an integrated document to the MFP 102 and printing out the integrated document by the MFP 102, a sending job used for sending the integrated document to an apparatus such as the MFP 102 or the client PC 101 using electronic mail or a protocol such as file transfer protocol (FTP), and a facsimile transmission job used for sending a facsimile to an external device by converting an integrated document into an image format used for facsimile transmission.

In step S2602, the CPU 202 determines whether the job whose execution instruction has been received is a job used for transmitting the integrated document to an external device. For example, if the job is local printing (YES in step S2602), then the process proceeds to step S2603. If the job is remote printing or a transmission job (NO in step S2602), then the process proceeds to step S2609. Since a facsimile transmission job is not a job used for transmitting an integrated document, it is determined as "NO" in step S2602. In step S2609, the CPU 202 executes the instructed job, and then the process ends.

In step S2603, the CPU 202 determines whether the integrated document which is to be transmitted is usable by the external device. If the integrated document is determined to be reusable (YES in step S2603), then the process proceeds to step S2609. If the integrated document is determined not to be reusable (NO in step S2603), then the process proceeds to step S2604.

Whether the integrated document is reusable by the external device is determined based on a type of the job. For example, if the integrated document is transmitted to the external device using the transmission job, the integrated document will be stored in a storage device of the external device. In this case, the integrated document can be searched for or edited by the external device. Thus, it is desirable not to delete information such as the editing keyword or the editing history.

On the other hand, if an integrated document is transmitted to the MFP 102 for execution of remote printing, then the MFP 102 executes only the print processing based on the integrated document, and the integrated document will not be stored in the MFP 102. In this case, since the MFP 102 does not use information such as the editing keyword or the editing history, it is desirable to delete such information and reduce data size before the integrated document is transmitted to the MFP 102. However, if the integrated document is not reused in the external device but the metadata includes information that is useful for the external device in executing the job, such information is not necessarily deleted. For example, if the metadata is image feature information, which is useful in converting vectorized data in an integrated document into rasterized data by raster image processing (RIP), it will not be deleted from the integrated document.

In step S2604, the CPU 202 determines whether any editing keyword is included in the metadata of the integrated document, which is an execution instruction target. If an editing keyword is included (YES in step S2604), then the process proceeds to step S2605. In step S2605, the CPU 202 deletes the editing keyword, and the process proceeds to step S2606. If no editing keyword is included (NO in step S2604), then the process proceeds to step S2606.

In step S2606, the CPU 202 determines whether any editing history is included in the metadata of the integrated document, which is the execution instruction target. If an editing history is included (YES in step S2606), then the process proceeds to step S2607. In step S2607, the CPU 202 deletes the editing history, and the process proceeds to step S2608. If an editing keyword is not included (NO in step S2606), then the process proceeds to step S2608.

In step S2608, the CPU 202 executes the instructed job or transmits the integrated document to the external device. Then the process ends.

According to the flowchart in FIG. 15, in a case where a transmission job used for transmitting an integrated document to an external device is executed, unnecessary data in the metadata of the integrated document can be deleted if the integrated document is not reused by the external device. In this way, a reduction in transmission efficiency can be prevented.

According to the present exemplary embodiment, by deleting the metadata in the integrated document at appropriate timing, wasting of a storage area used for storing an integrated document can be prevented, and further, transmission of the integrated document can be carried out more efficiently.

According to the flowcharts of FIGS. 13, 14, and 15, an editing keyword and editing history are selected as items to be deleted in the metadata. However, the item to be deleted can be either the editing keyword or the editing history, or it can be a different type of metadata. For example, information such as a search keyword or image feature information can be deleted. On the other hand, if information such as security information is deleted from the metadata, security of the integrated document will be reduced. Accordingly, information such as security information will not be deleted.

The present invention can be applied to a system including a plurality of devices, or to an apparatus including a single device. For example, a scanner, a printer, a PC, a copying machine, an MFP or a facsimile machine can constitute exemplary embodiments of the present invention.

The above-described exemplary embodiments can also be achieved by supplying a control program that realizes each function of the aforementioned exemplary embodiments, directly or by remote operation, to the system or the apparatus and a computer included in the system reading out and executing the provided program code.

Thus, the program code of the control program which is installed in the computer or the above-described apparatus to realize the function and processing according to an exemplary embodiment of the present invention constitutes the above-described embodiments. In other words, the control program configured to realize the function and processing according to an exemplary embodiment of the present invention constitutes the present invention.

In this case, a form of the program can be in any form, such as object code, a program executed by an interpreter, or script data supplied to an operating system (OS) so long as the control program has a function of a program.

A storage medium for storing the program includes a floppy disk, a hard disk, an optical disk, a magneto-optical disk, a compact disc read-only memory (CD-ROM), a compact disc-recordable (CD-R), a compact disc-rewritable (CD-RW), a magnetic tape, a non-volatile memory card, a ROM, and a digital versatile disc (DVD), such as a DVD-read only memory (DVD-ROM) and a DVD-recordable (DVD-R).

Further, the program can be downloaded by an Internet/intranet website using a browser of a client computer. The control program according to an exemplary embodiment of the present invention or a file including a compressed program and an automated install function can be downloaded from the website to a recording medium, such as a hard disk. Further, the present invention can be realized by dividing program code of the program according to an exemplary embodiment into a plurality of files and then downloading the files from different websites. In other words, a World Wide Web (WWW) server by which a program file used for realizing the function according to an exemplary embodiment is downloaded to a plurality of users can also constitute an exemplary embodiment of the present invention.

Furthermore, the program according to an exemplary embodiment of the present invention can be encrypted, stored in a storage medium, such as a CD-ROM, and distributed to users. In this case, the program can be configured such that only the user who satisfies a predetermined condition can download an encryption key from a website via the Internet/intranet, decrypt the encrypted program by the key information, execute the program, and install the program on a computer.

Further, the functions according to the aforementioned exemplary embodiments can be realized by a computer which reads and executes the program. An operating system (OS) or the like running on the computer can perform a part or whole of the actual processing based on the instruction of the program. This case can also realize the functions according to the aforementioned exemplary embodiments.

Further, a program read out from a storage medium can be written in a memory provided in a function expansion board of a computer or a function expansion unit connected to the computer. Based on an instruction of the program, a CPU of the function expansion board or a function expansion unit can execute a part or all of the actual processing. The functions according to the aforementioned exemplary embodiments can be realized in this manner.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-330955 filed Dec. 21, 2007, which is hereby incorporated by reference herein in its entirety.

What is claimed is:

1. An image processing apparatus capable of executing a plurality of types of jobs, the image processing apparatus comprising:
a storage unit configured to store an integrated document including image data and a plurality of types of accompanying information related to the image data;
a receiving unit configured to receive an instruction for executing a job for the integrated document stored in the storage unit;
a deletion unit configured to delete at least a part of the accompanying information of the integrated document for which the instruction for executing the job is received by the receiving unit, if the job for which the instruction for execution is received by the receiving unit is a predetermined type of job; and
an execution unit configured to execute the job for which the instruction for execution is received by the receiving unit,
wherein the predetermined type of job includes a job that is used for transmitting the integrated document to an external device and is unable to be reused by the external device.

2. The image processing apparatus according to claim 1, wherein the job that is used for transmitting the integrated document to an external device and is unable to be reused by the external device includes remote printing used for printing out the integrated document with the external device.

3. The image processing apparatus according to claim 1, wherein the deletion unit is configured to delete a predetermined type of accompanying information from among the accompanying information of the integrated document.

4. The image processing apparatus according to claim 3, wherein the predetermined type of accompanying information includes a keyword used for editing the integrated document.

5. The image processing apparatus according to claim 3, wherein the predetermined type of accompanying information includes information indicating an editing history of the integrated document.

6. The image processing apparatus according to claim 1, wherein, if the job for which the instruction for execution is received by the receiving unit is not the predetermined type of job, the deletion unit does not delete the accompanying information of the integrated document for which the instruction for executing the job is received by the receiving unit.

7. An image processing apparatus comprising:
a storage unit configured to store an integrated document including image data and a plurality of types of accompanying information related to the image data;
a detection unit configured to detect a size of a free space used for storing the integrated document in the storage unit; and
a deletion unit configured to delete a predetermined type of accompanying information from among the accompanying information of the integrated document stored in the storage unit, if the detection unit detects that the size of the free space is smaller than a predetermined size,
wherein the predetermined type of accompanying information includes accompanying information that is used for transmitting the integrated document to an external device and is unable to be reused by the external device.

8. An image processing apparatus comprising:
a storage unit configured to store an integrated document including image data and a plurality of types of accompanying information related to the image data;
a detection unit configured to detect an integrated document that has remained unaccessed for a predetermined period of time from among integrated documents stored in the storage unit; and
a deletion unit configured to delete a predetermined type of accompanying information from among the accompanying information of the integrated document detected by the detection unit,
wherein the predetermined type of accompanying information includes accompanying information that is used for transmitting the integrated document to an external device and is unable to be reused by the external device.

9. A method for controlling an image processing apparatus that is capable of executing a plurality of types of jobs, the method comprising:
storing an integrated document including image data and a plurality of types of accompanying information related to the image data in a storage unit;
receiving an instruction for executing a job for the integrated document stored in the storage unit;
deleting at least a part of the accompanying information of the integrated document for which the instruction for executing the job is received, if the job for which the instruction for execution is received is a predetermined type of job; and executing the job for which the instruction for execution is received wherein the predetermined type of job includes a job that is used for transmitting the integrated document to an external device and is unable to be reused by the external device.

10. A method for controlling an image processing apparatus, the method comprising:

detecting a size of a free space in a storage unit used for storing an integrated document including image data and a plurality of types of accompanying information related to the image data; and deleting a predetermined type of accompanying information from among the accompanying information of the integrated document stored in the storage unit, if the size of the free space is smaller than a predetermined size, wherein the predetermined type of accompanying information includes accompanying information that is used for transmitting the integrated document to an external device and is unable to be reused by the external device.

11. A method for controlling an image processing apparatus, the method comprising:

storing an integrated document including image data and a plurality of types of accompanying information related to the image data in a storage unit;

identifying an integrated document that has remained unaccessed for a predetermined period of time from among integrated documents stored in the storage unit; and deleting a predetermined type of accompanying information from among the accompanying information of the identified integrated document, wherein the predetermined type of accompanying information includes accompanying information that is used for transmitting the integrated document to an external device and is unable to be reused by the external device.

* * * * *